(12) United States Patent
Jamali

(10) Patent No.: US 12,521,131 B2
(45) Date of Patent: Jan. 13, 2026

(54) BONE CUTTING GUIDE SYSTEM FOR FEMORAL HEAD TRANSPLANTATION

(71) Applicant: Amir A Jamali, Oakland, CA (US)

(72) Inventor: Amir A Jamali, Oakland, CA (US)

( * ) Notice: Subject to any disclaimer, the term of this patent is extended or adjusted under 35 U.S.C. 154(b) by 331 days.

(21) Appl. No.: 18/370,240

(22) Filed: Sep. 19, 2023

(65) Prior Publication Data
US 2024/0090907 A1   Mar. 21, 2024

Related U.S. Application Data

(60) Provisional application No. 63/376,273, filed on Sep. 19, 2022.

(51) Int. Cl.
*A61B 17/17*   (2006.01)

(52) U.S. Cl.
CPC ................... *A61B 17/175* (2013.01)

(58) Field of Classification Search
CPC ............ A61B 17/1637; A61B 17/1659; A61B 17/1668; A61B 17/175; A61B 17/8897; A61F 2/3601; A61F 2/4644; A61F 2002/2828; A61F 2002/2835; A61F 2002/4645; A61F 2002/4649
See application file for complete search history.

(56) References Cited

U.S. PATENT DOCUMENTS

2023/0248539 A1\* 8/2023 Barfield ............. A61B 17/1666
606/99

\* cited by examiner

*Primary Examiner* — Samuel S Hanna
(74) *Attorney, Agent, or Firm* — Andrew F. Young, Esq.; NOLTE LACKENBACH SIEGEL

(57) ABSTRACT

A bone cutting guide for preparing a femoral head allograft for transplantation. The guide includes a base and a head holder disposed atop the base and having a hemispherical body with a hemispherical interior cavity for containing a femoral head. The head holder includes fenestrations through which to view a femoral head disposed within the head holder. Coupling elements disposed about its upper rim enable it to be coupled to a dome-shaped top having similar coupling elements. The top includes an upwardly extending cylindrical portion with a cylindrical central passage provides a passage to pass a tool to machine a femoral head contained in the connected head holder and top. A disc-shaped guidewire guide rests securely atop the upwardly extending cylindrical portion and has a center hole through which to pass a guidewire.

14 Claims, 18 Drawing Sheets

BONE CUTTING GUIDE SYSTEM FOR FEMORAL HEAD TRANSPLANTATION

CROSS REFERENCES TO RELATED APPLICATIONS

The present application claims the benefit of U.S. Provisional Patent Application Ser. No. 63/376,273, filed Sep. 19, 2022 (Sep. 19, 2022), which application is incorporated in its entirety by reference herein.

BACKGROUND OF THE INVENTION

Field of the Invention

The present invention relates most generally to surgical bone transplants. More particularly, the present invention relates to a device and a method of using the device for the preparation and transplantation of the femoral head from a human donor to human recipient.

Background Discussion

Osteochondral allografts have been used for a wide variety of injuries to joint surfaces. They are most commonly used in connection with knees and ankles. More recently there has been increasing interest in using osteochondral allografts for the treatment of the femoral head. To date, however, this application has been limited by the difficulty in machining the donor femoral head to precisely match the appropriate dimensions for the recipient's femoral head, and thus to provide stable fixation of the patient's femoral head.

The present invention addresses this persisting shortcoming in the current art. Specifically, the present invention provides the framework for precise placement of the donor femoral head in a machining workstation with subsequent rigid fixation of the femoral head within the workstation. Rigid fixation is imperative for machining the inner dimension of the femoral head to accommodate the neck of the patient's femoral head, thus facilitating a "press-fit" of the graft onto the femoral neck of the patient. As used herein and commonly in the art, a "press-fit" is defined as a minimal difference in circumferential dimensions (e.g., the diameter), and thus minimal clearances, between the inner dimension of the graft and the outer dimension of the patient's bone such that the respective surfaces are approximated and engage one another; the interference and friction between the two segments provides an immediate stable fixation of the graft onto the patient bone. This "press-fit" can further be augmented with hardware as appropriate and as desired.

BRIEF SUMMARY OF THE INVENTION

Preparation of the donor femoral head starts with the femoral head workstation. This device is provided with a generally planar base, thereby enabling it to be stably placed on a work surface area or workbench. It is further provided with a superiorly placed hemispherically-shaped component having a hemispherical or near hemispherical cavity, denominated the concave head holder, or simply head holder.

The head holder is manufactured with any of a number of desired radiuses as needed for the application and based on the femoral head sizes to be transplanted. For human use, the typical ranges in diameter are between 36 mm and 66 mm. In an alternative embodiment, the head holder may be provided in a single size with variable inner head size adaptors that have an outer diameter exactly matching the inner diameter of the head holder and an inner diameter matching the size of the femoral head to be transplanted. For example, a 66 mm head holder can be prepared and fitted with an inner head adaptor having an inner diameter of 42 mm (a 21 mm radius and depth) and an outer diameter of 66 mm (a 33 mm radius and depth). Thus, a 42 mm head can be prepared with this combination of dimensions.

The femoral head workstation head holder and the inner head size adaptors each include multiple fenestrations which function as viewing windows for viewing the femoral head to confirm that it is fully seated in the head holder. Close monitoring through the fenestrations is critical to achieving the needed precision in the degree and depth of preparation of the femoral head graft. Further, the head holder includes an upper rim with a generally planar top surface, as well as a plurality of coupling or connection elements, e.g., outwardly extending bosses.

The head holder cooperates with a workstation top to capture and secure the donor femoral head to be machined and configured. The workstation top is a generally hemispherical (partial dome) attachment formed by a plurality of spaced apart arch elements that merge into the side of an extending cylindrical top having a planar superior surface (upper rim) and a cylindrical central passage measuring between 20 mm and 50 mm in diameter. The inferior surface of the lower rim of the workstation top nearly identically matches the superior surface of the concave head holder of the femoral head workstation and also includes coupling structure, e.g., fixation bosses, extending outwardly. These bosses are configured to overlay the bosses in the head holder and are provided with through holes that align with the through holes on the bosses extending from the superior surface of the concave head holder. It will be appreciated that spacing between the arch elements provides additional viewing windows for a surgeon to observe the femoral head enclosed within the structures.

A guidewire guide comprising larger and smaller integral coplanar discs is provided for placement of a guidewire in a femoral head disposed in the concave head holder (and any head size adapted included). The upper disc (superior portion) is wider than the lower disc (inferior portion). The inferior portion is configured with a diameter very slightly smaller than the cylindrical central passage of the workstation top and therefore inserts into the workstation top. The guidewire guide contains a central hole measuring between 1.5 and 6 mm in diameter for passage of a guidewire or guide pin into the central axis of the guidewire guide, and subsequently the workstation top and into the central axis of the femoral head and the femoral head workstation.

Pegs are provided to insert through the aligned through holes of the bosses of the workstation top and concave head holder. The pegs are placed in such a way to maintain a stable orientation of the workstation top and the femoral head workstation relative to one another.

After the guidewire is placed and the guidewire guide removed, a femoral head reamer is disposed over the guidewire and translates down the guidewire under rotation provided by a power drill. The reamer passes through the cylindrical central passage and creates a central cavity within the donor graft. The femoral head reamer includes a cannulated superior shaft with a central aperture of between 1.5 and 6 mm. On its inferior aspect, the reamer is provided with between two and up to 8 blades such that by passage into the femoral head it creates a central cavity. This central cavity is proportioned with exactly of the same dimensions as the prepared cylindrical femoral neck of the patient. The width or radius of the femoral head reamer is exactly equal to the reamer guide that fits within the workstation top. The depth of the reamer is preset such that it matches exactly the height of the patient's prepared femoral neck to enable the surgeon to match the depth of preparation such that stable fixation is achieved while the height of the femoral head is maintained.

BRIEF DESCRIPTION OF SEVERAL VIEWS OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
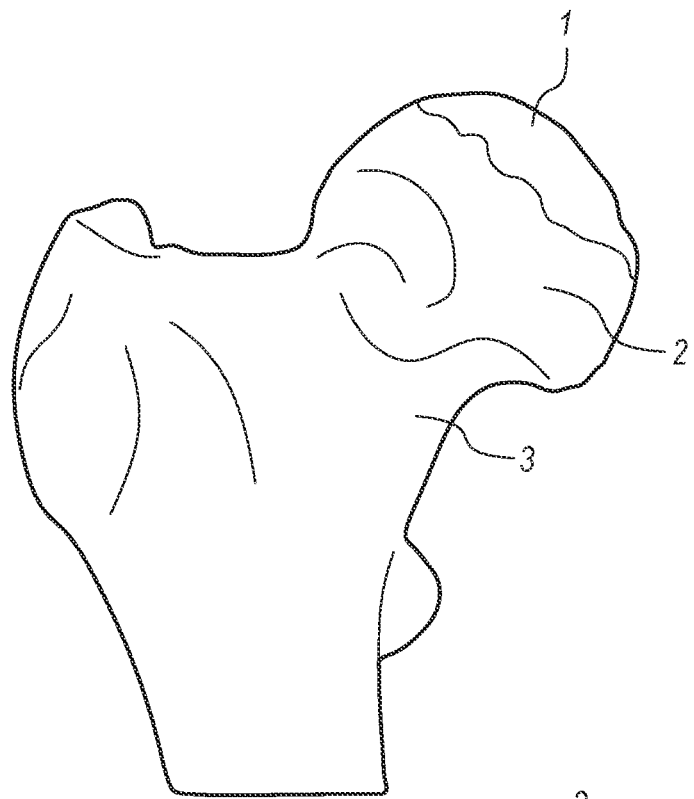
FIG. 1 is an anterior view of a diseased femur having, for instance, avascular necrosis or osteoarthritis.

FIG. 1 is an anterior view of a right femur suffering from avascular necrosis and osteoarthritis at the superior aspect of the head 1. The residual portion of the femoral head 2 and of the femoral neck 3 are normal.

Figure 2:
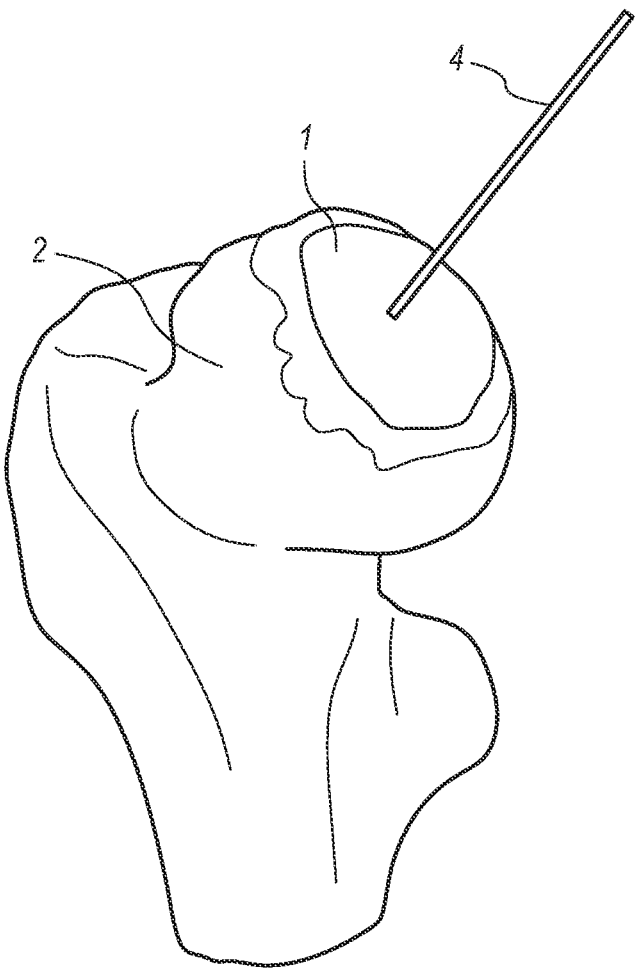
FIG. 2 is a superior perspective view thereof demonstrating the avascular zone.

FIG. 2 is a superior perspective view of the same femoral head demonstrating the avascular zone 1 of the femoral head surrounded by the healthy femoral head 2. A guidewire 4 has been placed centrally within the femoral head lesion.

Figure 3:
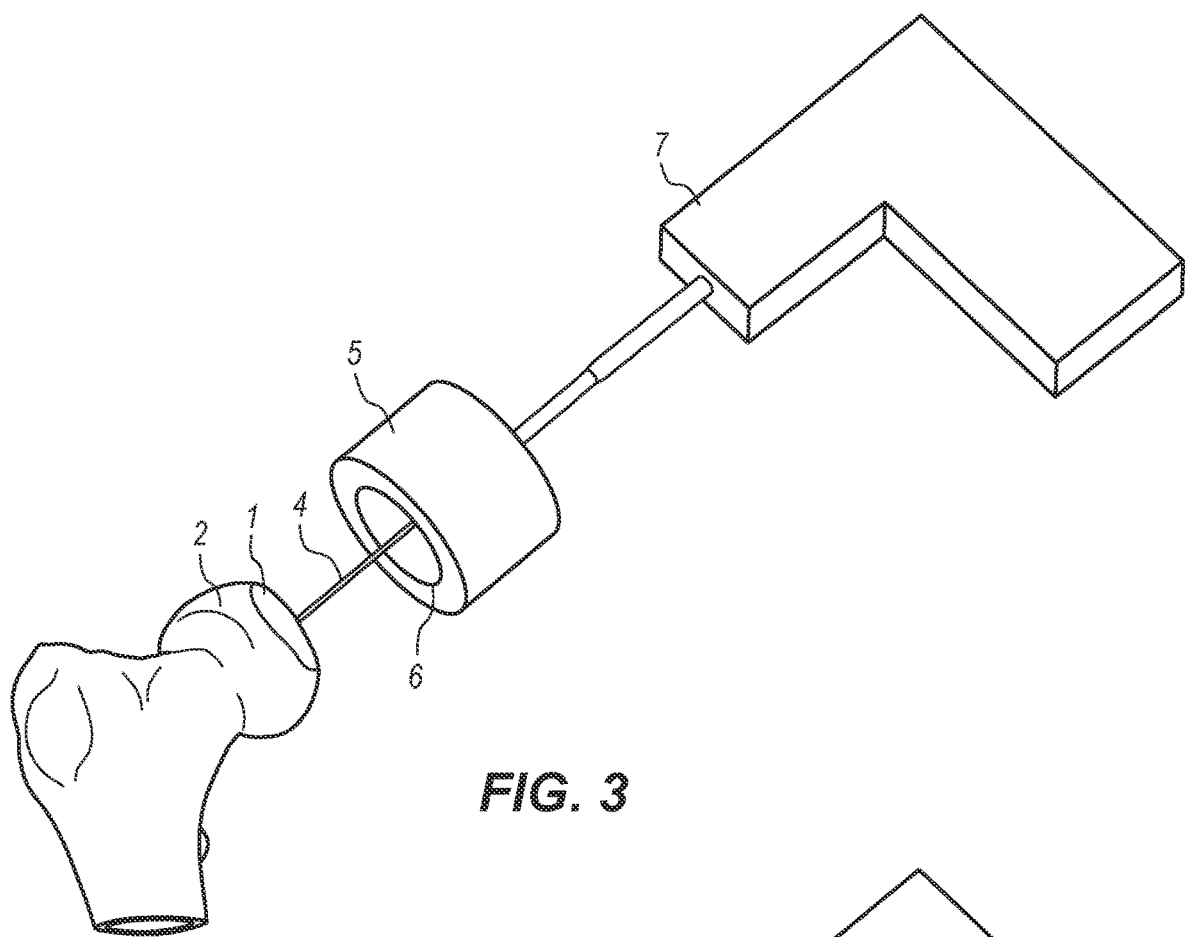
FIG. 3 is an anterior perspective view thereof showing the avascular necrosis lesion, shown with a cylindrical coring reamer coupled to, and poised for machining, the right femur.

FIG. 3 is an anterior perspective view of the diseased femoral head showing the avascular necrosis lesion 1, the native healthy femoral head 2, the guidewire 4, and a cylindrical coring reamer 5 with a central channel and a distal cutting surface 6 to accommodate the guidewire. The reamer is attached to a rotary driver drill 7 (shown schematically here) through its rigid cylindrical shaft. The cylindrical coring reamer is held in the "up" position, away from the surface of the head as a starting point.

Figure 4:
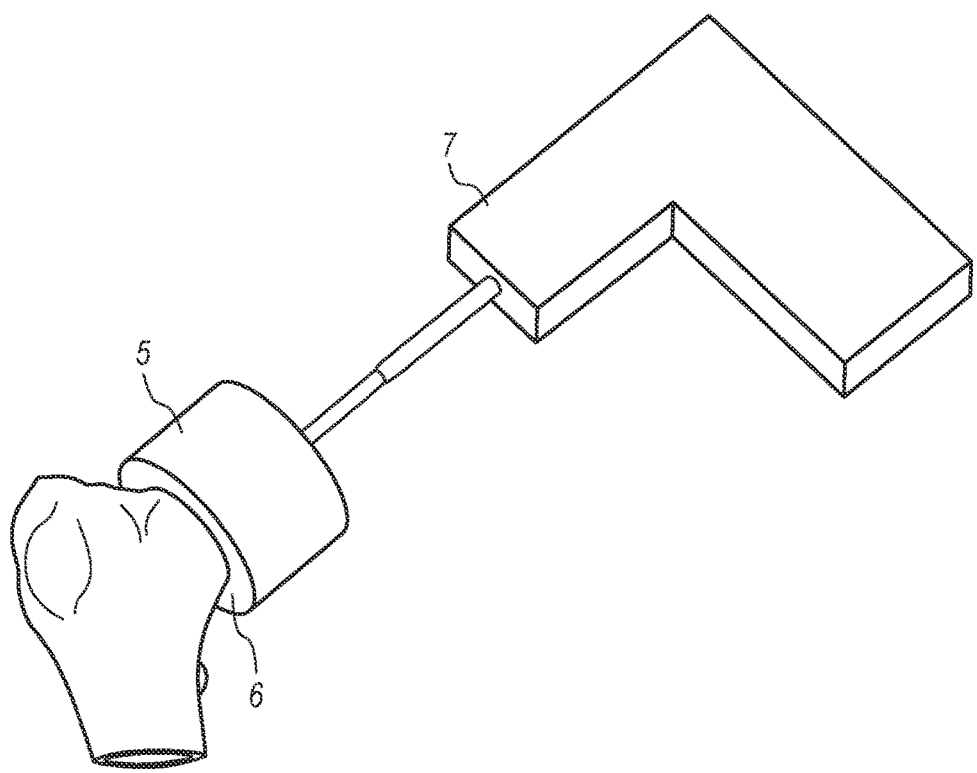
FIG. 4 is an anterior perspective view of the diseased femoral head showing the cylindrical coring reamer in operation with a power drill.

FIG. 4 is an anterior perspective view of the diseased femoral head showing the cylindrical coring reamer 5 brought to the "down" position with the rotational action of the drill 7. The guidewire (not shown) maintains the proper path for the coring reamer 5 coaxially aligned with the longitudinal axis of the previously placed guidewire. The distal cutting surface 6 removes the bone around the femoral head and at the top of the femoral neck through the action generated by the rotary driver.

Figure 5:
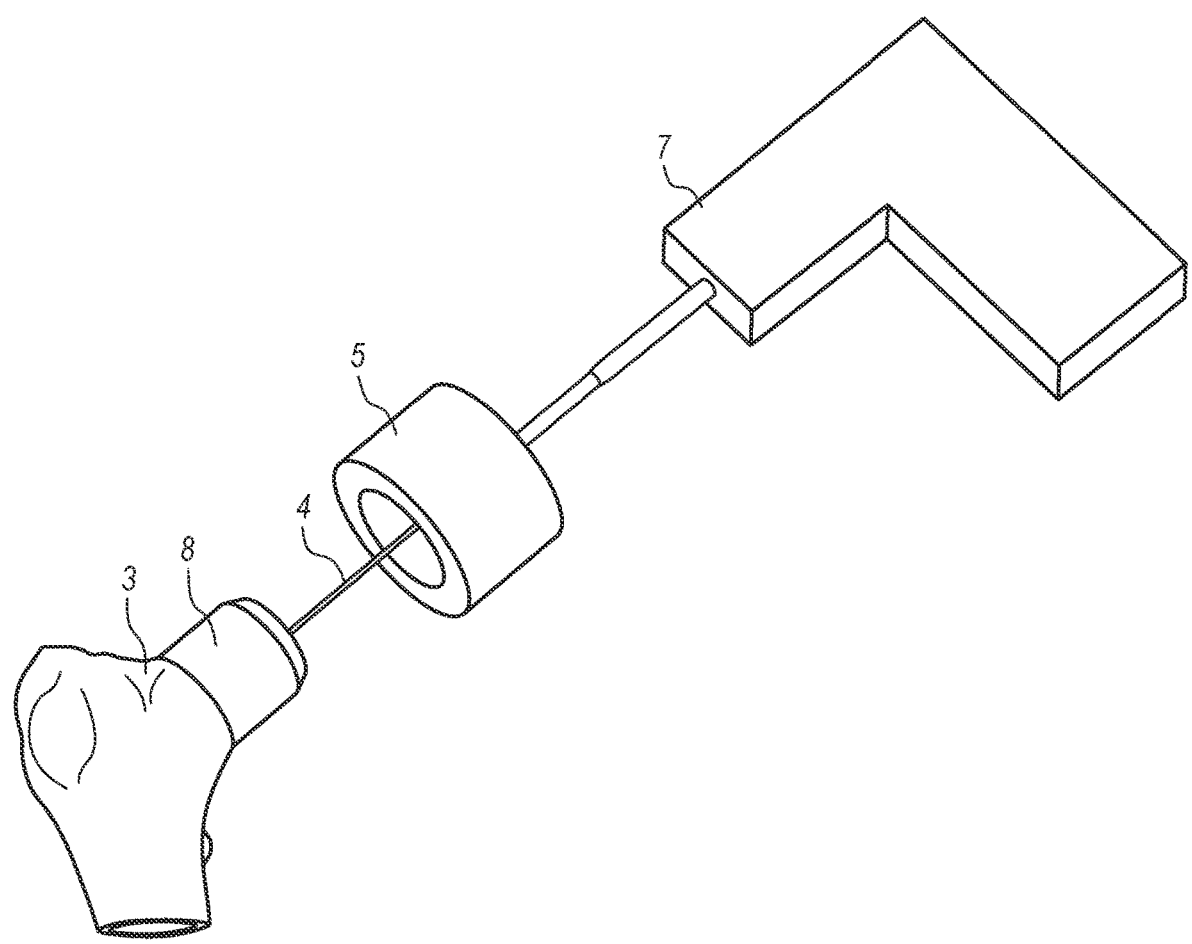
FIG. 5 is an anterior view of the diseased femoral head showing the cylindrical coring reamer removed from the femoral head after precision configuring of the femoral head into a cylindrical shape.

FIG. 5 is an anterior view of the diseased femoral head showing the cylindrical coring reamer 5 brought back to the "up" position through the rotational action of the drill 7. The reamer is backed up along the guidewire 4. The patient's femoral head has now been contoured into a precisely machined cylindrical bone segment 8 through the removal of bone at the superior aspect to create a smooth cylindrical surface 8a having a uniform cylindrical circumference 8b. The femoral neck 3 remains untouched.

Figure 6:
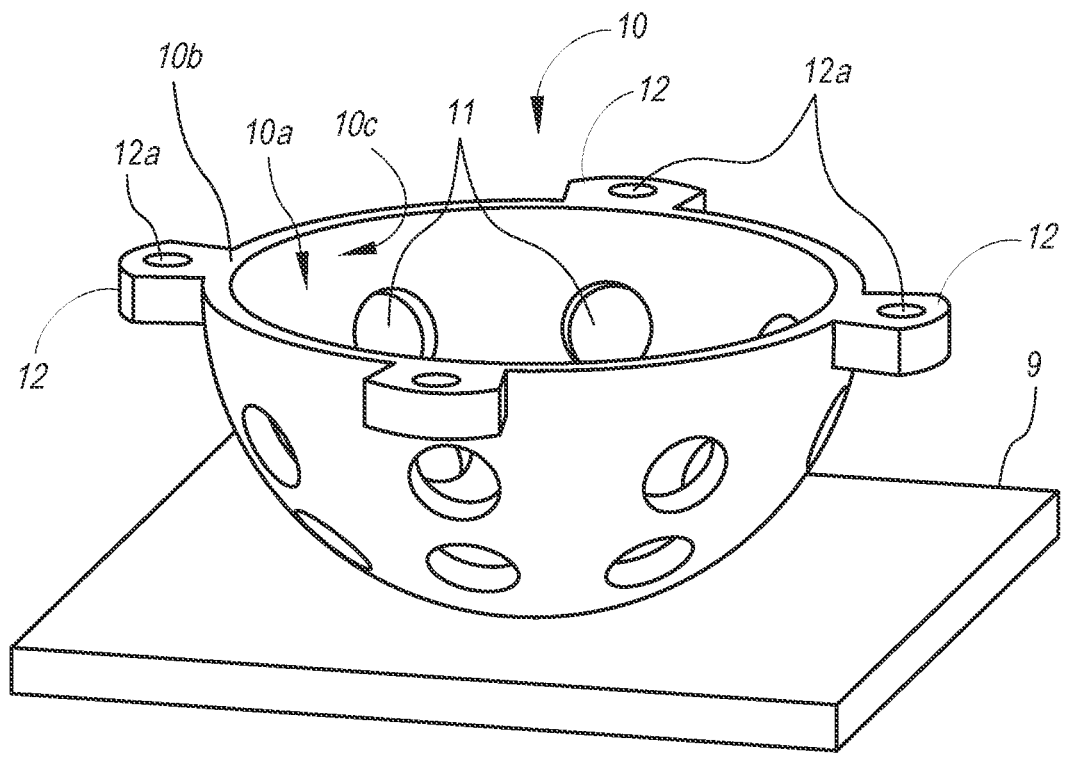
FIG. 6 is an upper perspective view of the femoral head workstation base with a concave head holder disposed on its upper surface.

FIG. 6 is a perspective view showing a femoral head workstation base 9 having generally planar upper and lower surfaces, 9a, 9b, respectively. The workstation is here shown with a concave head holder 10 (herein "concave head holder" or "head holder") disposed on the upper surface 9a. The head holder includes a generally hemispherical body 10a, and a generally hemispherical inner concavity and inner surface 10c. A plurality of fenestrations (viewing windows) 11 in the body of the head holder enable a surgeon to view the circumferential contact between the femoral head being contoured and the inner surface of the head holder. This is necessary to confirm full seating of the femoral head in the head holder and to avoid excessively deep preparation of the femoral head. In embodiments, the fenestrations are circular cut outs or through holes, but the shape is a non-limiting feature.

At the upper periphery of the head holder and disposed about its upper rim 10b, multiple (e.g., 3-5) protruding bosses 12 are disposed in generally even spacing and are configured with fixation structure (e.g., cylindrical through holes 12a) through which bolts or other coupling elements are passed for eventual fixation of a workstation top (not shown but described fully below).

Figure 7:
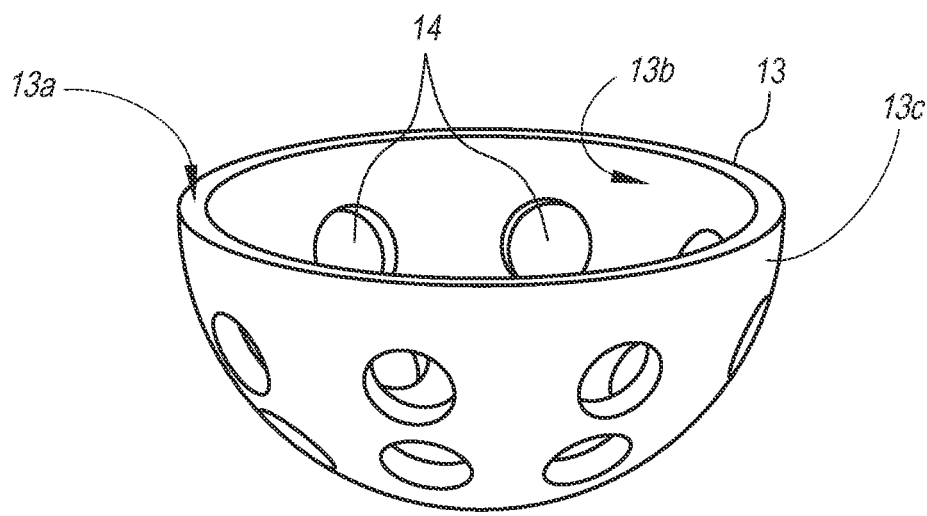
FIG. 7 is an upper perspective view of a head size adapter.
Figure 8:
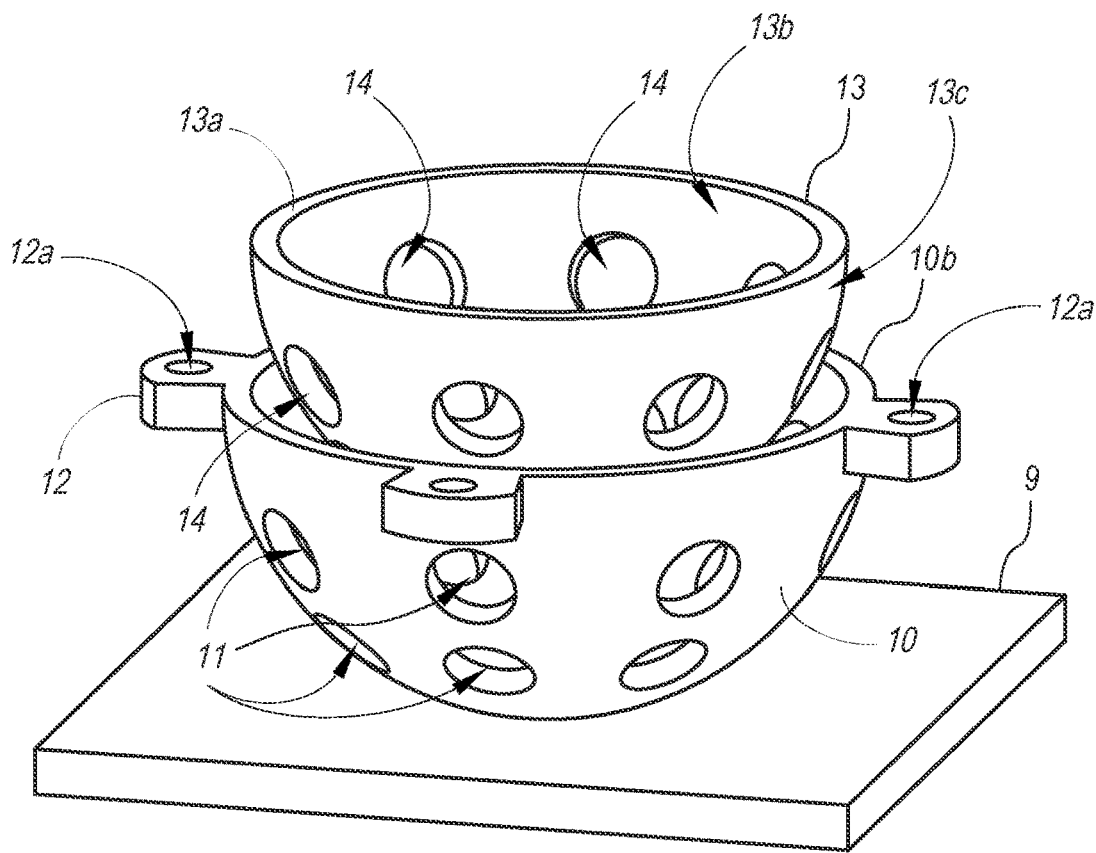
FIG. 8 is an upper perspective view of the femoral head workstation base, concave head holder, and head size adapter in the process of assembly.

Referring next to FIGS. 7 and 8, there is shown a head size adapter and its insertion into the head holder. FIG. 7 is a perspective view of a head size adapter 13. This adapter is configured with external dimensions to match precisely the inner dimension of the head holder, including identically placed and aligned fenestrations 14. The inner dimension (i.e., the diameter at the upper rim 13a) of a head size adapter is variable with sizes generally ranging from 36 mm to 66 mm, inclusive, to cover a wide range of femoral head sizes. This enables precise matching of the inner surface of the head size adapter to any size femoral head graft within 1 to 2 mm. When placed within the head holder, the upper rim 13a of the head size adapter is coplanar with the upper rim 10b of the head holder. The hemispherical inner concavity 13b is configured and adapted to accept and accommodate a femoral head.

As can be seen, FIG. 8 is a perspective view of the femoral head workstation base 9 with the hemispherical concave head holder 10 disposed on its upper surface. The head size adapter 13 is shown being lowered into the concave head holder such that the outer hemispherical surface 13c of the head size adapter matches exactly (and thus fully contacts) the inner dimension of the concave head holder 10 thereby achieving the required fenestration alignments and full stability.

Figure 9:
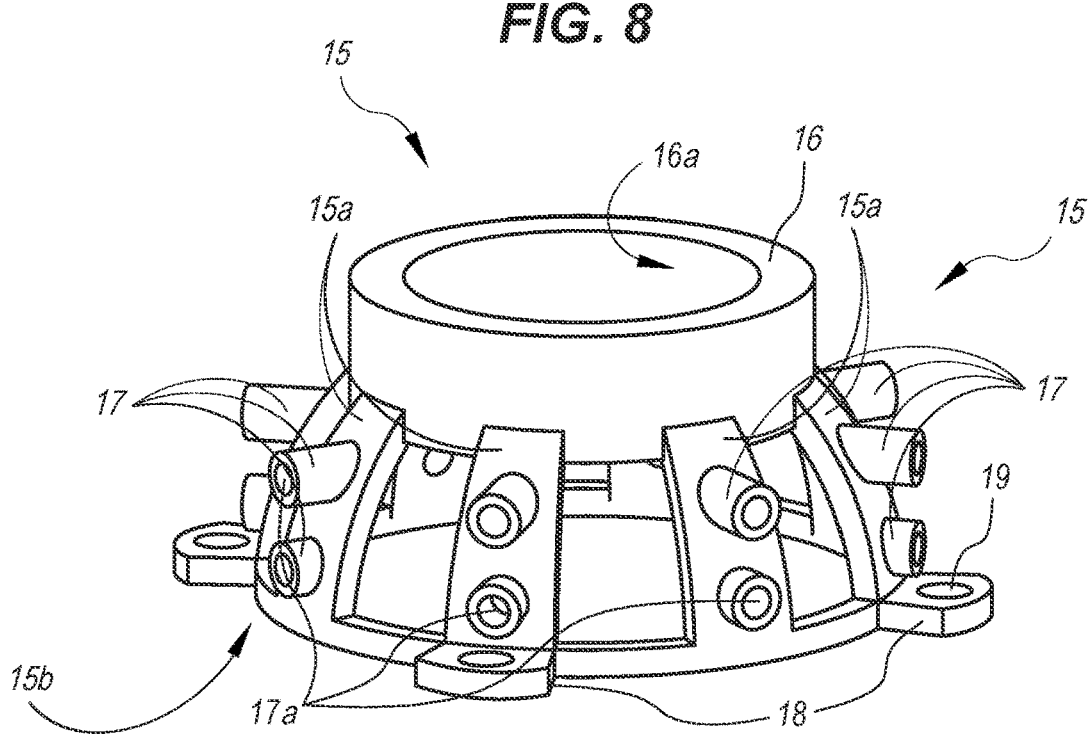
FIG. 9 is an upper perspective view of the workstation top.

FIG. 9 is a perspective view of the workstation top 15. The workstation top is dome shaped, generally hemispherical, comprising a plurality of spaced-apart arch elements 15a configured to create a partial dome that closely matches the dimensions of the concave head holder. At its lower rim 15b, circumferentially, the workstation top matches the upper rim 10b of the concave head holder exactly such that the surfaces of the workstation top lower rim 15b and the upper rim of the concave head holder are approximated when attached. The arch elements converge into an upwardly extending cylindrical portion 16 (an extended cylindrical portion) having a cylindrical central passage 16a to accommodate a femoral head reamer (not shown in this view) and an annular upper rim 16b to support a guidewire guide (discussed below) and to function as a tool stop.

Disposed about, and extending outwardly from, the outer circumference of the lower rim is a plurality of bosses (or extensions) 18 spaced identically to the bosses 12 of the upper rim of the head holder. Cylindrical through holes (i.e., locking apertures) 19 align with those 12a in the bosses 12 of the concave head holder. Additionally, multiple cylindrical bosses 17 extend from the arch elements 15a of the workstation top 15, each with a central cannulation 17a measuring between 1 and 5 mm, which facilitate passage of wires or pins for fixation of the femoral head to the concave head holder and workstation top.

Figure 10:
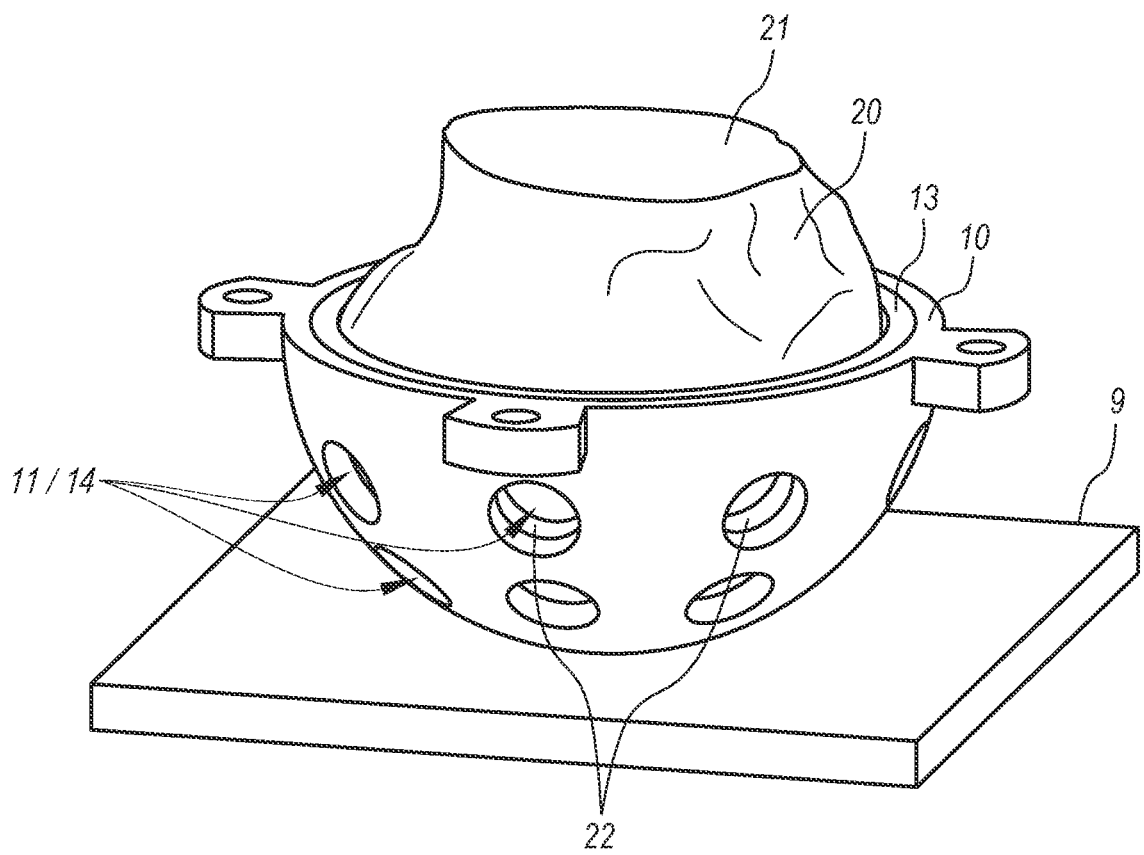
FIG. 10 is an upper perspective view of the assembled femoral head workstation base, concave head holder, and head size adapter, with a donor femoral head disposed within the hemispherical concavity of the head size adapter.

FIG. 10 is a perspective view of the femoral head workstation base 9 with a hemispherical concave head holder 10 disposed on its upper surface, as well as a head size adapter 13 having been fully inserted and seated into the concave head holder 10. A femoral head allograft 20, having been cut at the femoral neck 21, is placed in an inverted position within the hemispherical concavity of the head size adapter 13 such that the outer surface of the femoral head is in full contact with the inner surface of the head size adapter 13. The cartilaginous surface of the femoral head 22 can be seen through the aligned concave head holder and head size adapter fenestrations, 11 and 14, respectively, to be in contact with the inner surface 13b of the head size adapter 13.

Figure 11:
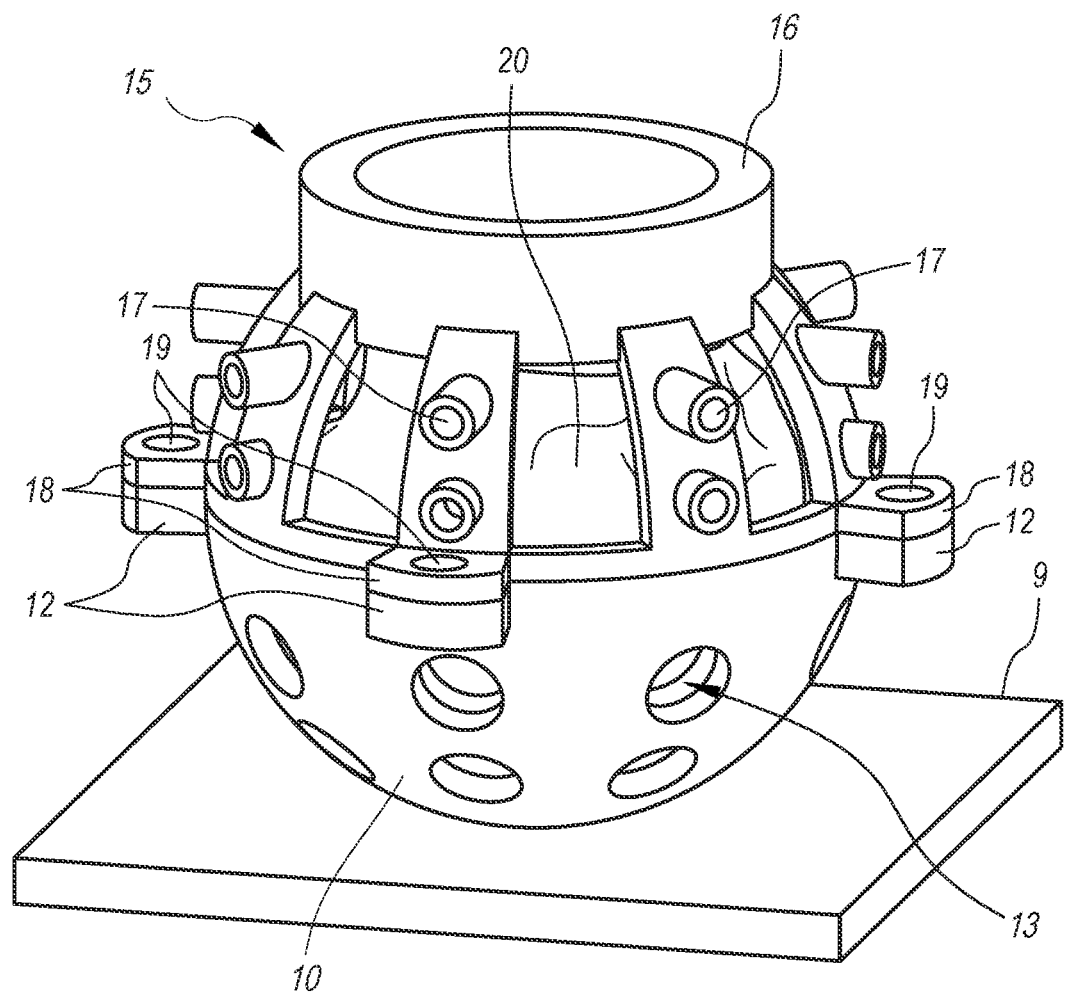
FIG. 11 is a perspective view of the assembled femoral head workstation base, concave head holder, head size adapter, and workstation top, with a femoral head disposed within the assembly.

FIG. 11 is a perspective view of the femoral head workstation base 9, concave head holder, and workstation top 15. The femoral head 20 is firmly placed within the combined head size adapter and concave head holder portions 13 and 10, respectively, of the workstation base 9. The workstation top 15 is installed on the concave head holder with the top surface of the upper rim of the concave head holder exactly matching the inferior surface of the lower rim of the workstation top. As such, the multiple extended bosses 12 on the workstation concave head holder approximate the multiple extended bosses 18 on the inferior surface of the workstation top 18 and their respective corresponding through holes also align for placement of fixation pegs, pins, bolts, or other attachment elements. As, it is seen that multiple bosses 17 extend from the arch elements 15a of the workstation top 15 with central cannulations 17a for later fixation of the femoral head graft.

Figure 12:
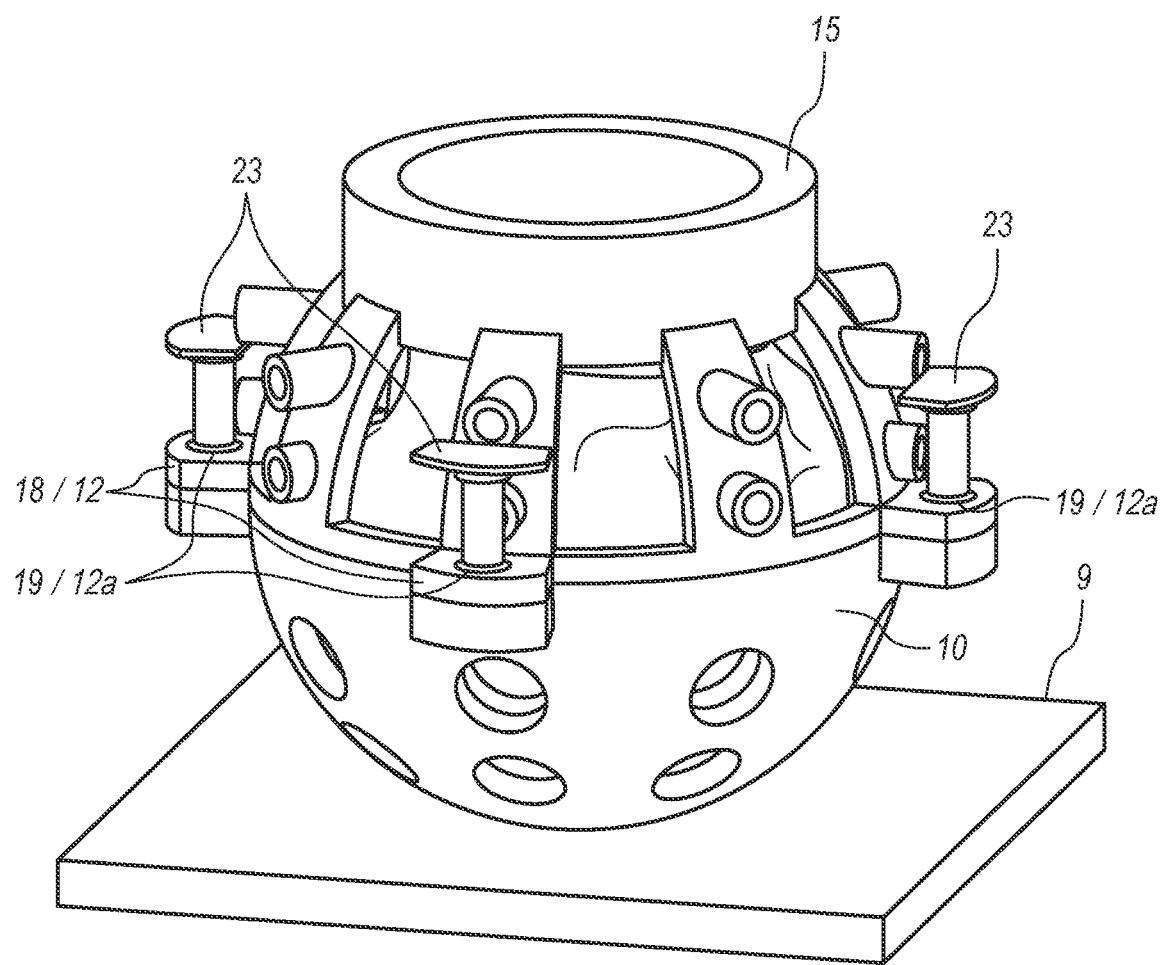
FIG. 12 is the same view showing locking pegs securing the workstation top to the concave head holder.

FIG. 12 is another perspective view showing the assembled femoral head workstation base 9, its concave head holder 10, and the workstation top 15. Locking pegs 23 are shown inserted through the aligned through holes 19/12a of the matching bosses 18/12. The locking pegs 23 maintain contact and orientation between the femoral head concave head holder of the workstation base and the workstation top. In this image, the locking pegs are disposed slightly above the through holes (locking channels) as if in the process of being inserted or placed.

Figure 13:
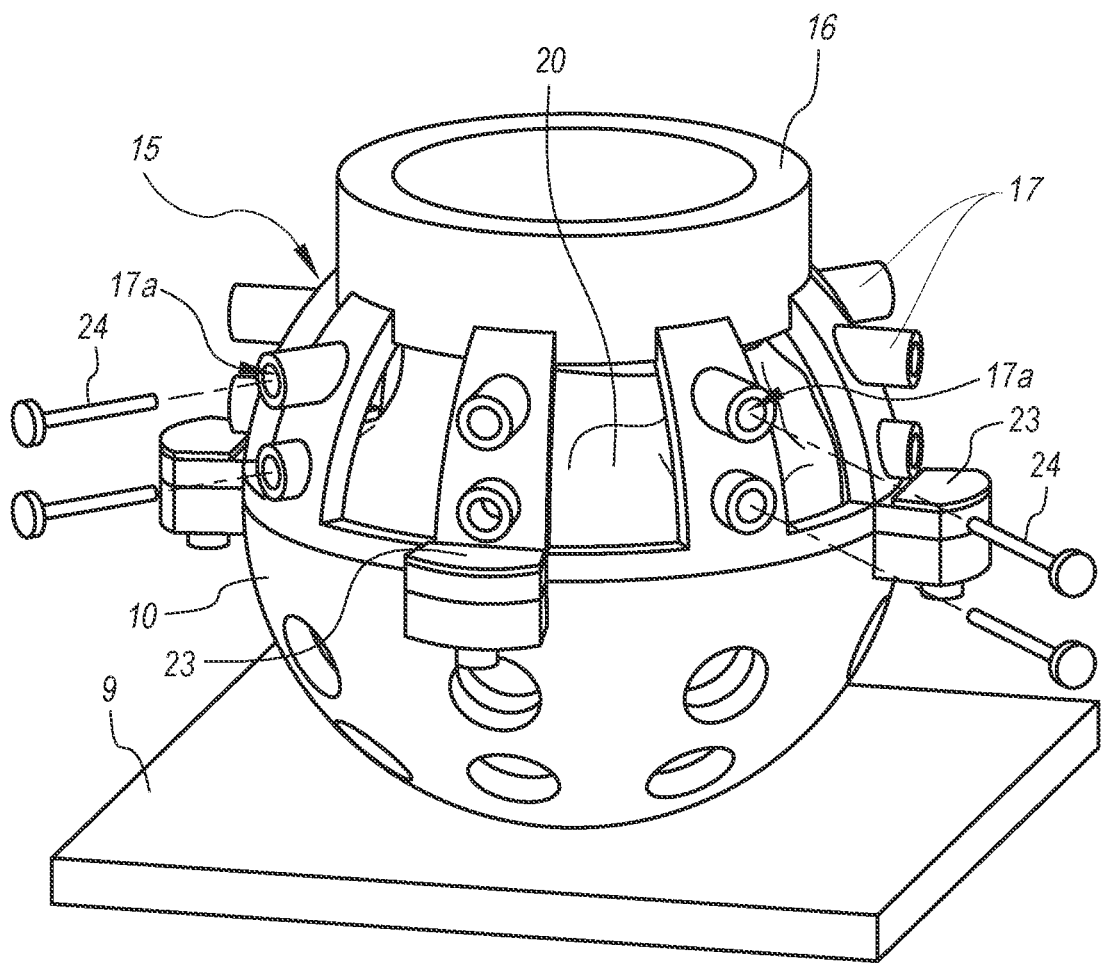
FIG. 13 is again the same view, further showing locking screws being passed through inner cannulations in bosses in the workstation top.

FIG. 13 is a perspective view of the construct of the femoral head workstation base 9 and its concave head holder 10 and the workstation top 15. The locking pegs 23 are shown here fully inserted into the cylindrical through holes 19/12a of the matching bosses 18/12. A plurality of locking screws 24 are inserted into the central cannulations of the workstation top bosses 17 such that the screws pass through the central cannulations of the bosses and into the femoral head graft 20, holding it securely in place.

Figure 14:
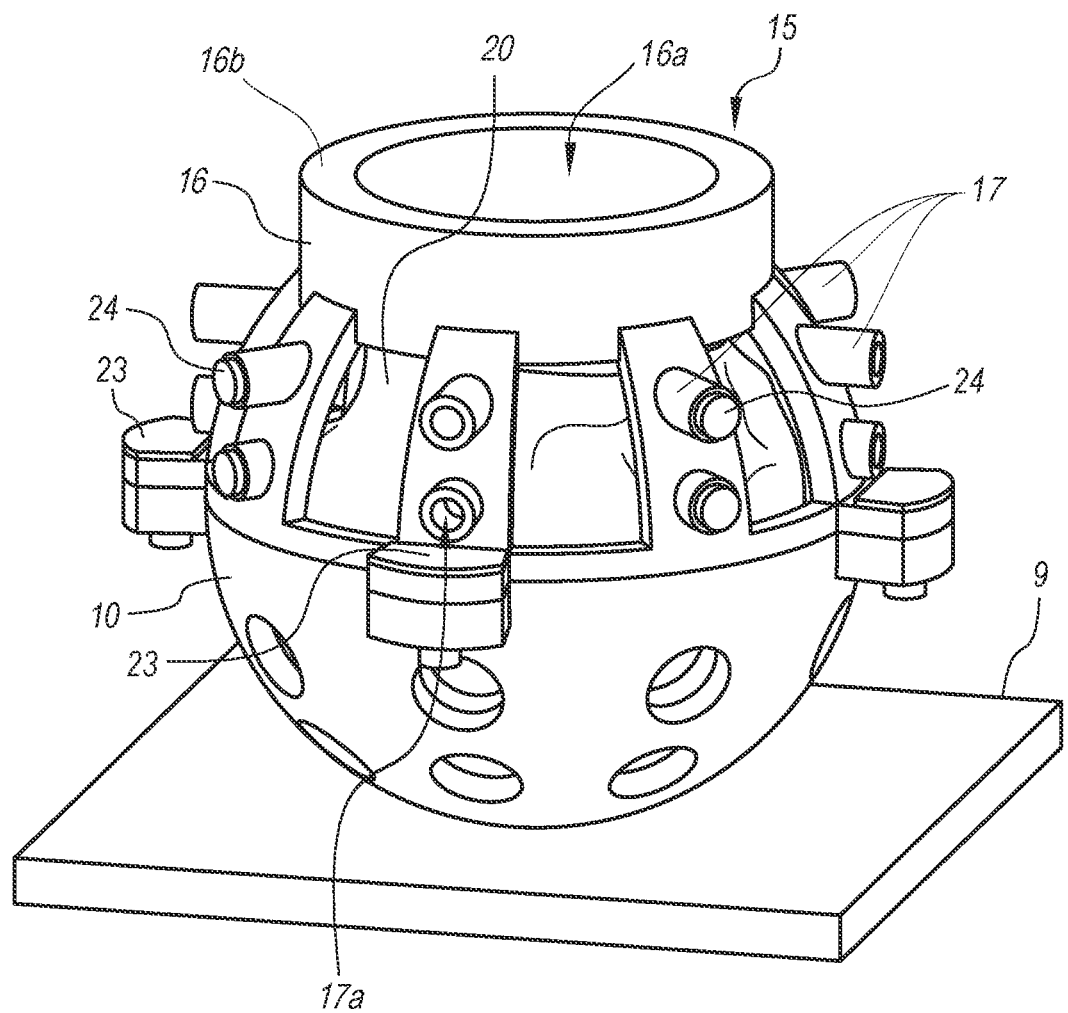
FIG. 14 is the same view, here showing the locking screws fully inserted through the inner cannulations and into the femoral head.

FIG. 14 is another perspective view of the assembled femoral head workstation base 9, concave head holder 10, and workstation top 15. The locking pegs 23 here are fully engaged, securing the concave head holder and workstation top to one another. The multitude of locking screws 24 are fully inserted through the inner cannulations 17a of bosses 17 and into the femoral head 20.

Figure 15:
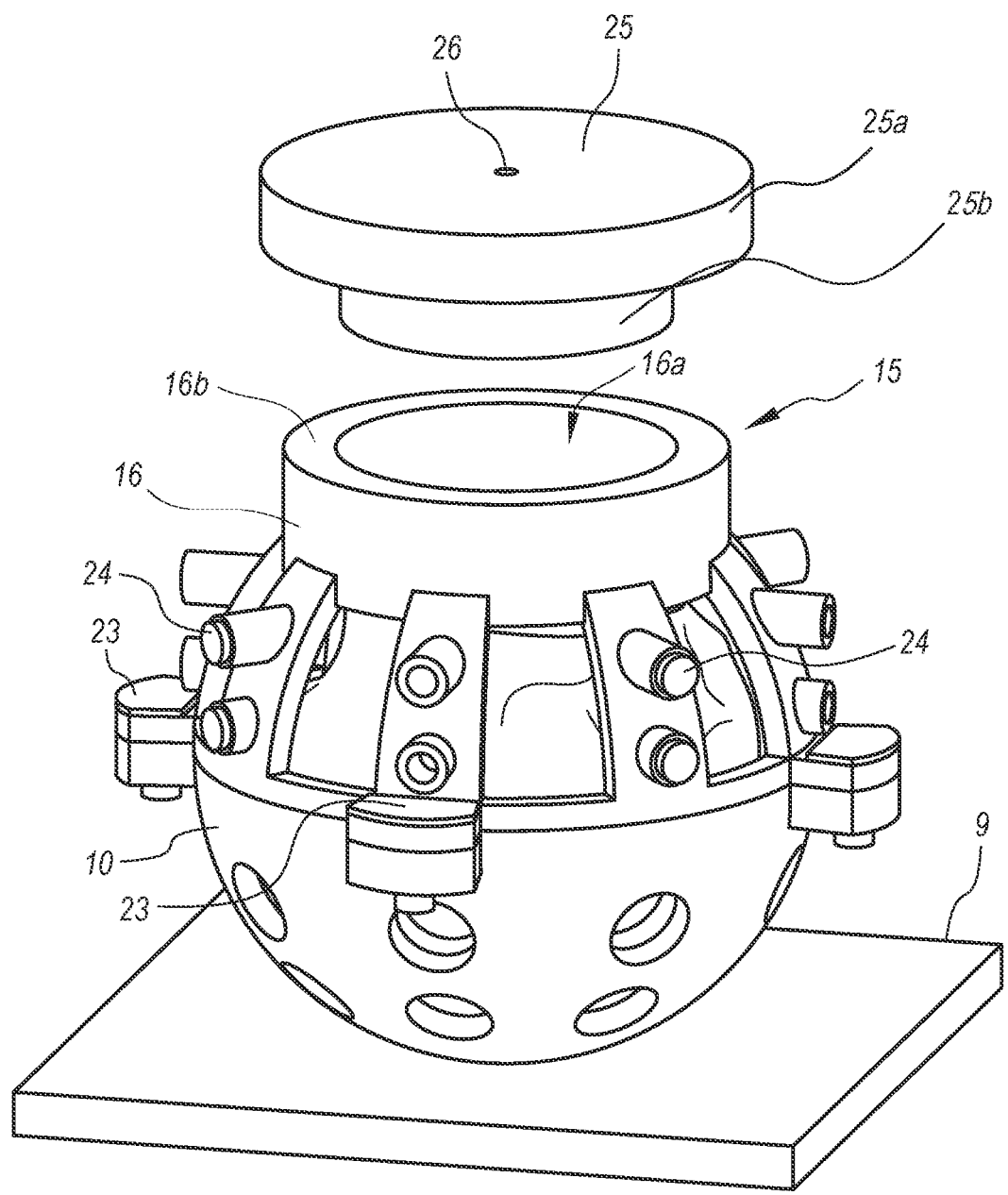
FIG. 15 is the same view showing a guidewire guide poised for placement atop the workstation top.

FIG. 15 is the same perspective view of the assembled femoral head workstation base 9, its concave head holder 10, and the workstation top 15. Here, the locking pegs 23 and locking screws 24 are fully engaged. Further, a guidewire guide 25 consisting of integral superior or inferior (upper and lower) concentric discs 25a, 25b, the former sized to cover the upper rim 16b of the extended cylindrical portion 16, and the latter sized to insert into the cylindrical central passage 16a of the extended cylindrical portion, such that the inferior cylinder fits precisely into the cylindrical central passage 16a. The guidewire guide 25 is disposed with a central cannulation 26 to accommodate a rigid guidewire (not shown).

Figure 16:
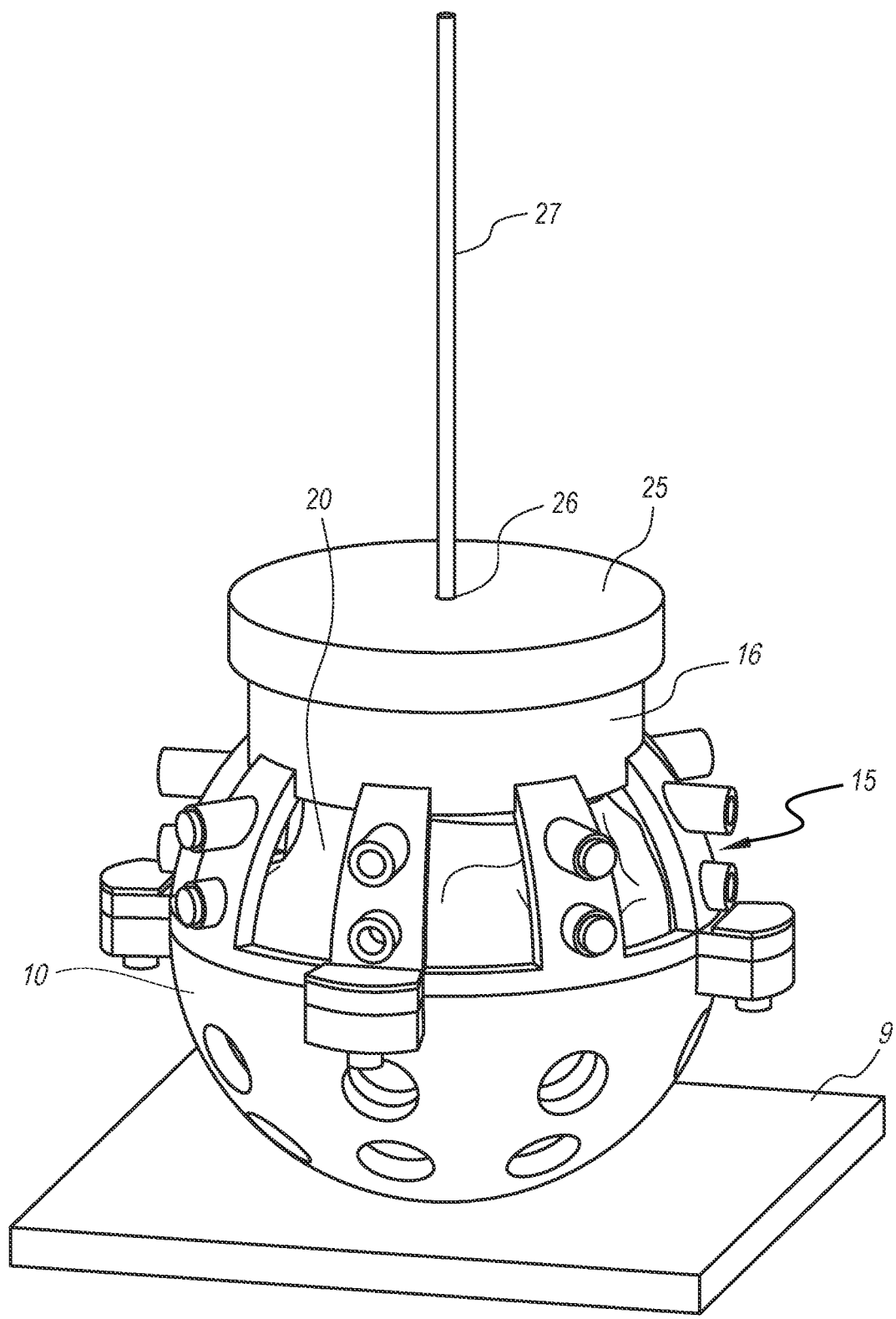
FIG. 16 is the same view showing the guidewire guide installed and a guidewire disposed through the guidewire guide and into the femoral head.

FIG. 16 is an upper perspective view of the assembled workstation base 9, concave head holder 10, and workstation top 15, here shown with the guidewire guide 25 placed onto the upper rim (superior surface) of the extended cylindrical portion 16 of the workstation top 15. A rigid guidewire 27, is drilled into and through the central cannulation 26 of the guidewire guide 25 and into the femoral head graft 20.

Figure 17:
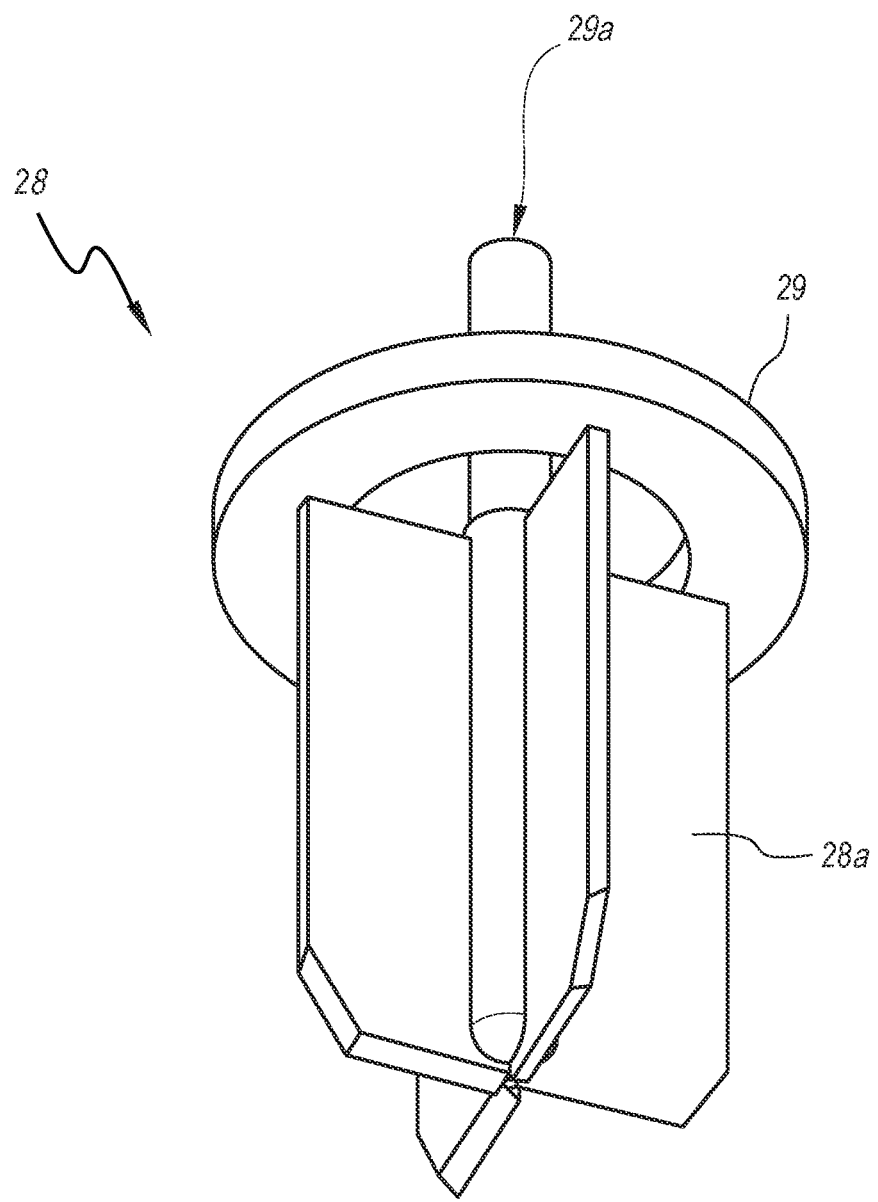
FIG. 17 is a lower perspective view of a cannulated reamer.

FIG. 17 is a lower perspective view of a cannulated reamer 28 with a generally planar top 29. The reamer may have between two and ten blades 28a with a central cannulated core 29a.

Figure 18:
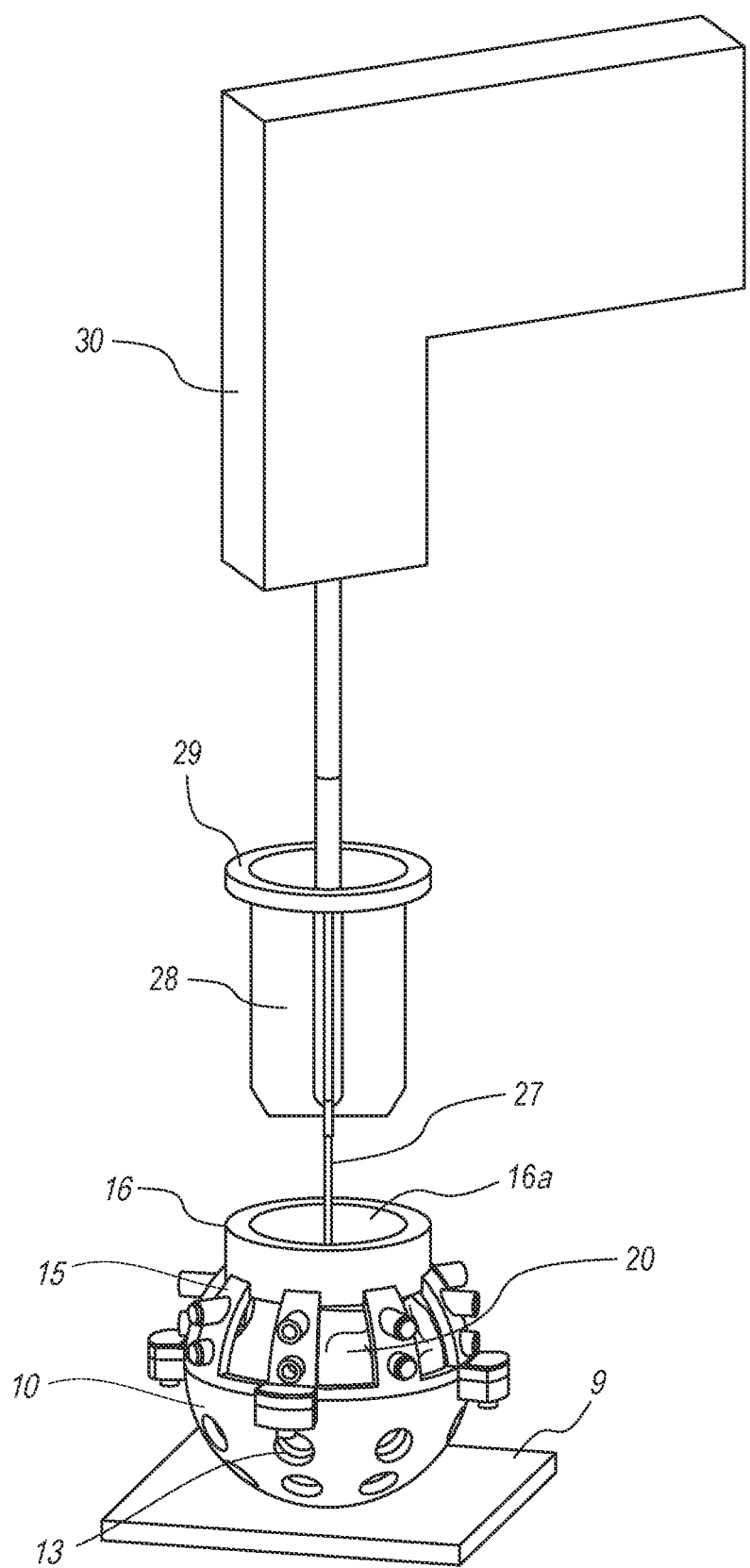
FIG. 18 is an upper perspective view of the assembled femoral head workstation containing the femoral head, a rigid guidewire placed within the femoral head, and a cannulated reamer disposed on the guidewire.

FIG. 18 is a perspective view of the assembly containing a femoral head 20 readied for precision machining of a femoral head. A rigid guidewire 27 placed within the femoral head. The central cannulated core 29a of the reamer 28 is secured to a drill 30 and under clockwise drill rotation the reamer is passed down the rigid guidewire 27 through the cylindrical central passage 16a of the workstation top 15. The planar top 29 of the reamer acts as an end stop when it comes into contact with the upper rim 16b of the extended cylindrical portion 16 of the workstation top 15, thus limiting and controlling the depth of preparation of the femoral head graft 20.

Figure 19:
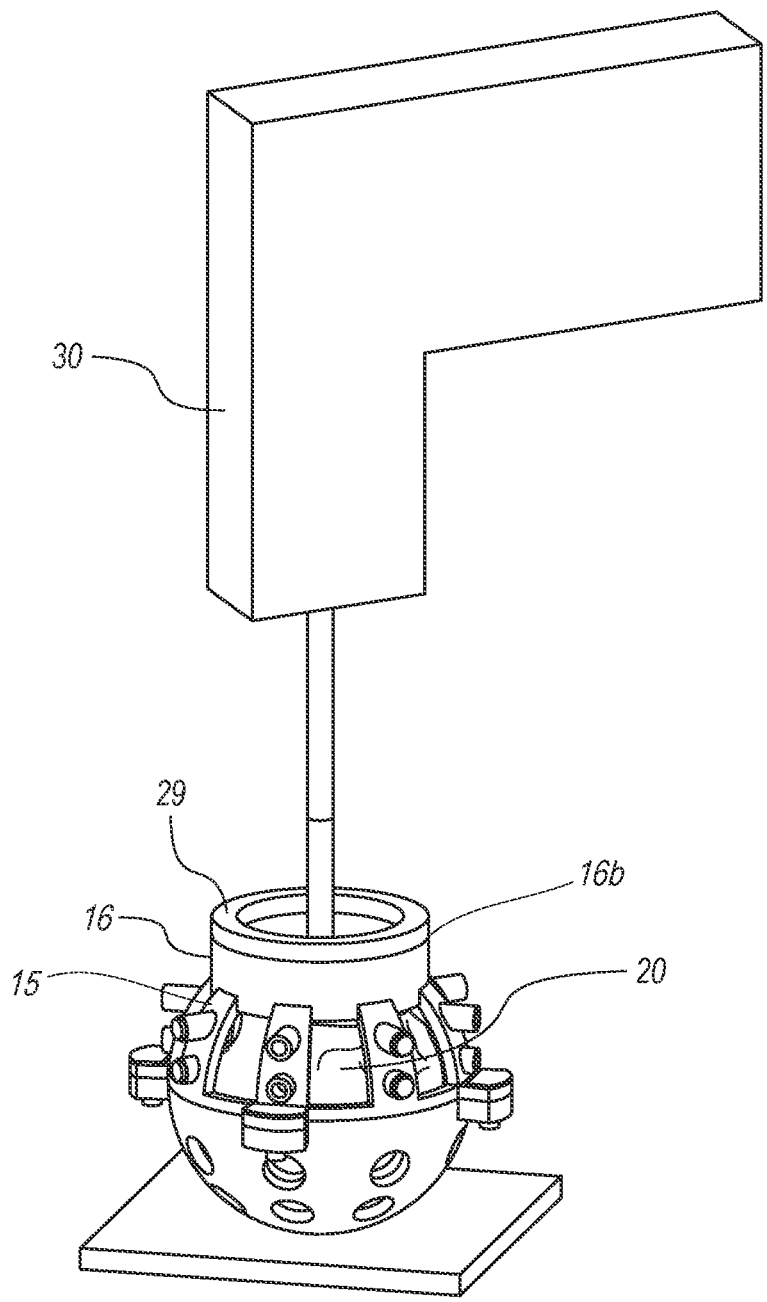
FIG. 19 is the same view showing the cannulated reamer rotating and being passed down the rigid guidewire and into the femoral head.

FIG. 19 is the same perspective view of the assembly containing the femoral head 20, here showing the cannulated reamer passed down the rigid guidewire and into the femoral head 20 such that the planar top 29 makes contact with the workstation top 16b.

Figure 20:
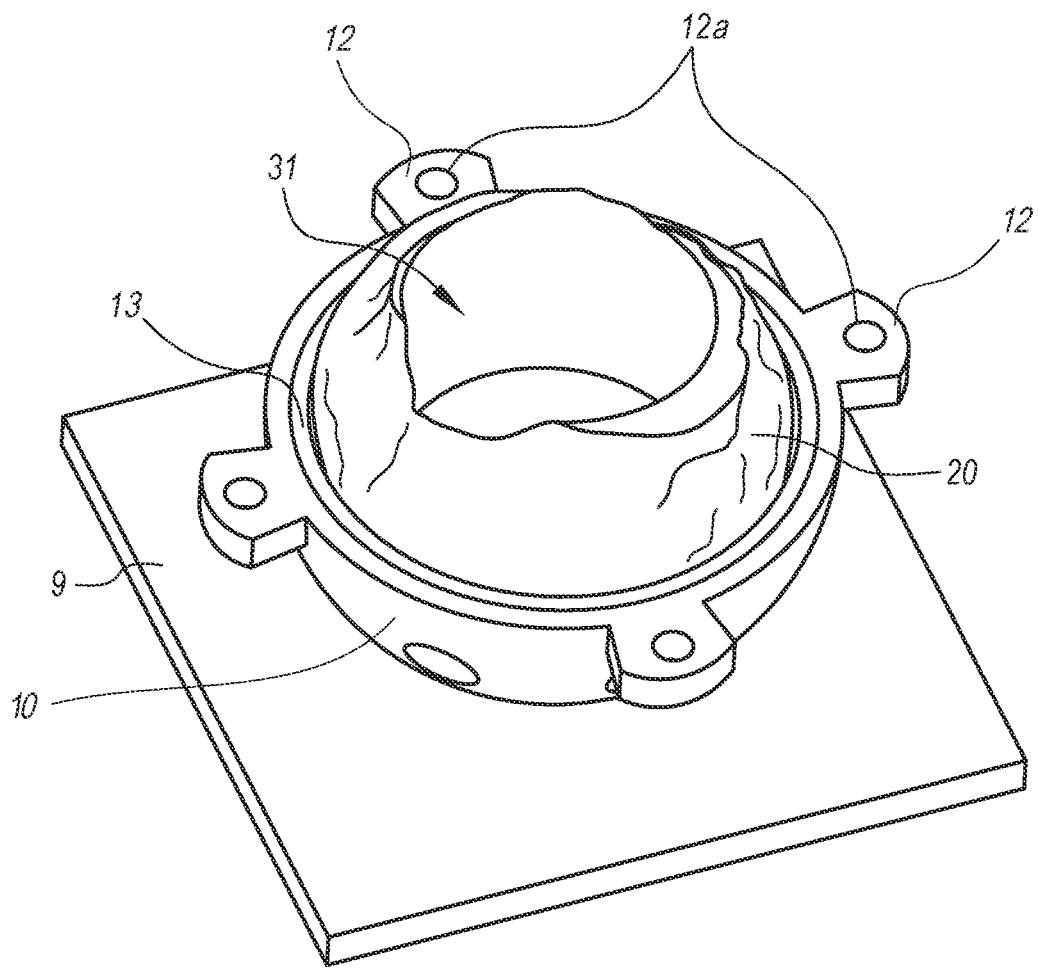
FIG. 20 is a perspective view of the femoral head workstation base and the prepared femoral head after removal of the pegs, the guidewire, and the workstation top.

FIG. 20 is a perspective view of the femoral head workstation base 9 after removal of the pegs from the peg holes 12a, the guidewire and the workstation top. The now prepared femoral head 20 has a precisely machined cylindrical cavity 31 reamed to a set diameter and depth.

Figure 21:
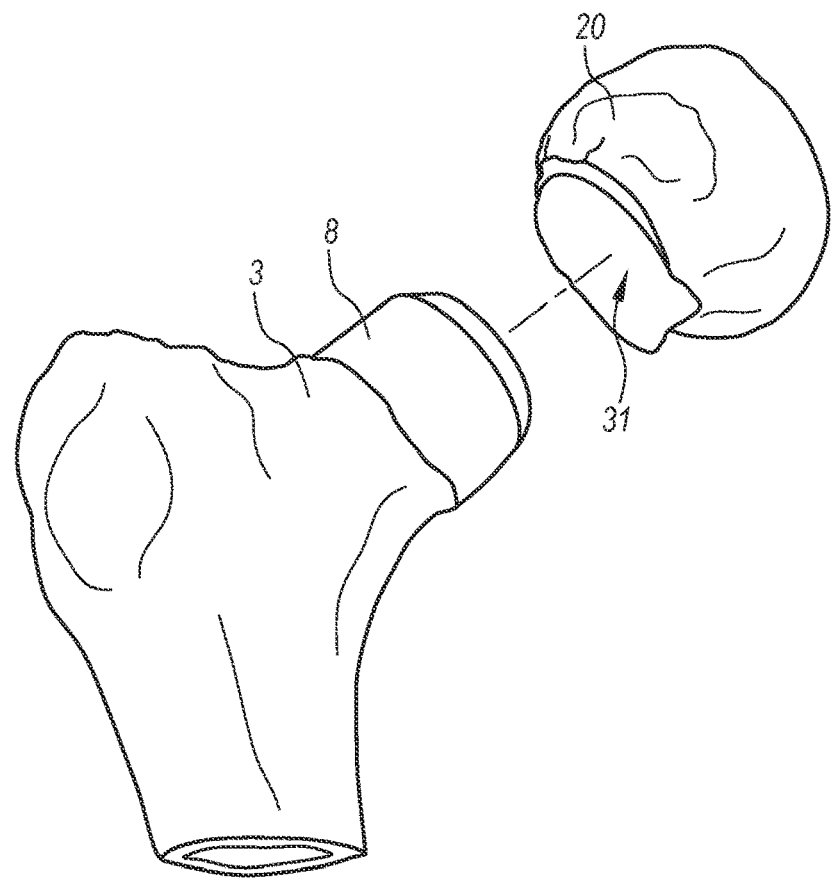
FIG. 21 is an anterior perspective view of the surgical field where the femoral head allograft is placed on the patient's previously prepared femoral head.

FIG. 21 is an anterior perspective view of the surgical field where the femoral head allograft 20, with its prepared cylindrical cavity 31, is aligned and placed on the recipient patient's previously prepared femoral head 8 and the unprepared native femoral neck 3.

Figure 22:
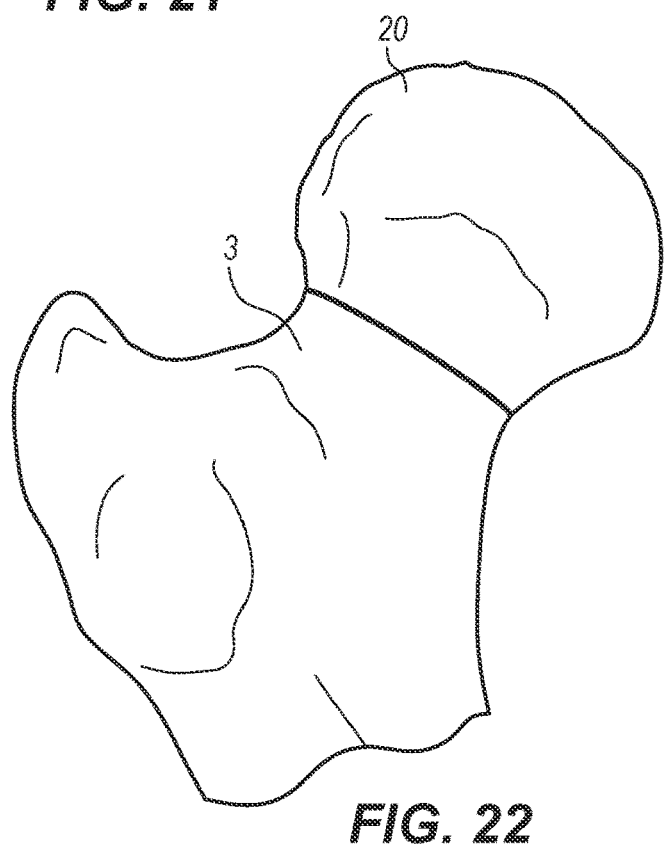
FIG. 22 is a superior perspective view of the surgical field where the femoral head allograft is fully seated on the femoral head of the patient.

FIG. 22 is a superior perspective view of the surgical field where the femoral head allograft 20 is fully seated on the femoral head of the patient with a smooth transition from the graft femoral head to the patient's native femoral neck 3.

Figure 23:
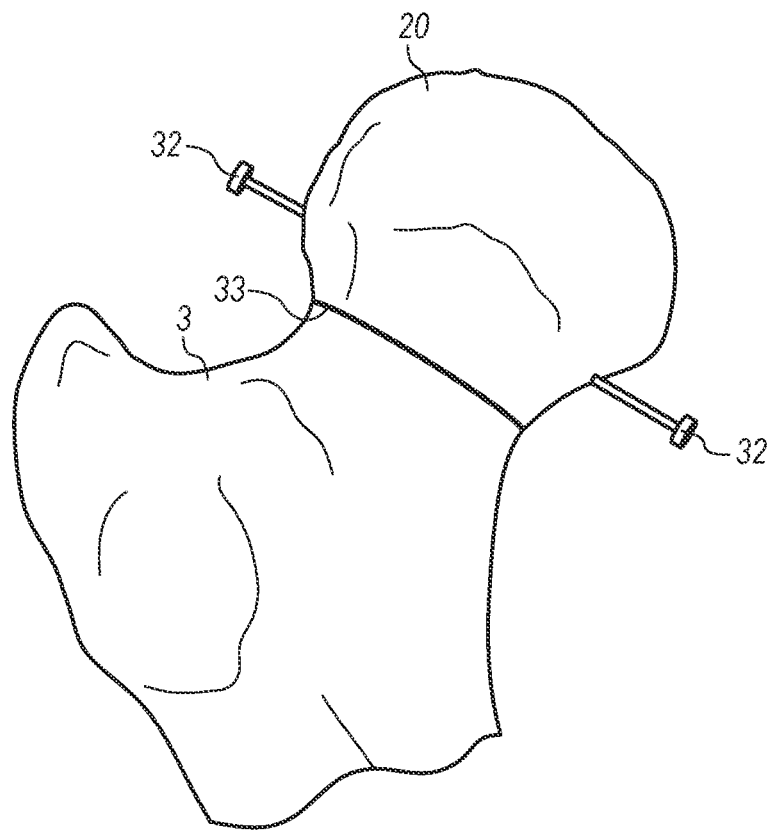
FIG. 23 is an anterior view of the surgical field where the press fit of the allograft femoral head is augmented with headed screws.

FIG. 23 is an anterior view of the surgical field where the press fit of the allograft femoral head 20 is augmented with headed screws 32 that are buried beneath the cartilage surface to secure the allograft head to the patient's femoral neck 3 thereby provided a stable interface 33 between the graft and the patient's bone.

Figure 24:
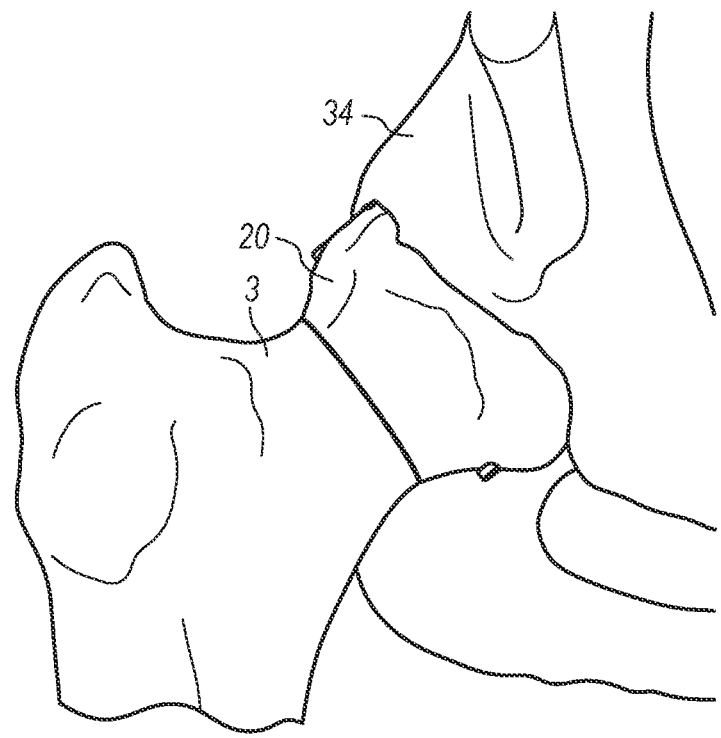
FIG. 24 is an anterior view of the surgical field where the femoral head allograft has been placed back into the native acetabular cavity.

FIG. 24 is an anterior view of the surgical field where the femoral head allograft 20 secured to the patient's femoral neck 3 has been reduced into the native acetabular cavity 34.

What is claimed as invention is:

1. A bone cutting guide system for preparing an allograft femoral head for the treatment of osteoarthritis and avascular necrosis of the femoral head, said system comprising:
   a workstation base having a substantially planar bottom side configured for placement on a work surface;
   a head holder disposed atop said workstation base, said head holder having a substantially hemispherical body with a substantially hemispherical interior cavity and inner surface defining the substantially hemispherical interior cavity for supporting a femoral head, said substantially hemispherical body of said head holder including a plurality of fenestrations extending therethrough through which to view a femoral head disposed within said interior cavity, a circumferential upper rim having an upper surface, and coupling structure disposed about and extending from said upper rim;
   a generally dome-shaped top defining a generally hemispherical interior volume, said generally dome-shaped top having a plurality of windows extending therethrough through which said femoral head disposed within said interior volume may be viewed, a circumferential lower rim sized to match that of said upper rim of said head holder, a coupling structure disposed about and extending from said lower rim to engage said coupling structure of said upper rim of said head holder, and an upwardly extending cylindrical portion with a cylindrical central passage through which to pass a cutting tool and an annular upper rim; and
   a disc-shaped guidewire guide configured to rest securely atop said annular upper rim and partly within said upwardly extending cylindrical portion, said guidewire guide having a center hole through which to pass a guidewire.

2. The bone cutting guide system of claim 1, wherein said fenestrations are circular openings.

3. The bone cutting guide system of claim 1, wherein said coupling structure on each of said upper and lower rims are outwardly extending bosses having through holes that align when said head holder and said generally done-shaped top are approximated at their respective upper and lower rims.

4. The bone cutting guide system of claim 3, further including locking pegs configured to insert through said through holes in said bosses of each of said head holder and said top.

5. The bone cutting guide system of claim 3, wherein said further including locking structure comprising locking pins configured to pass through the holes of said outwardly extending bosses of each of said head holder and said generally dome-shaped top.

6. The bone cutting guide system of claim 3, further including locking pegs configured to insert through said through holes in said bosses of each of said head holder and said generally dome-shaped top.

7. The bone cutting guide system of claim 1, wherein said guidewire guide includes integral upper and lower discs, said upper disc sized to rest atop said annular upper rim of said upwardly extending cylindrical portion and said lower disc sized with a diameter closely matching a diameter of said cylindrical central passage of said upwardly extending central portion so as to provide a friction fit.

8. The bone cutting guide system of claim 1, further including at least one head size adapter having a hemispherical interior concavity and configured with external dimensions to match precisely an inner dimension of said interior cavity of said head holder and having fenestrations positioned and sized to align with said fenestrations of said head holder when inserted, said head size adapter having an upper rim that is coplanar with said upper rim of said head holder when inserted and seated in said head holder.

9. The bone cutting guide system of claim 8, wherein said at least one head size adapter including a plurality of head size adapters with a range of inner diameters at their respective upper rims between 36 mm to 66 mm, inclusive, to accommodate and securely hold a wide range of femoral head sizes.

10. The bone cutting guide system of claim 1, wherein said generally dome-shaped top comprises a plurality of spaced apart arch elements converging at said upwardly extending cylindrical portion.

11. The bone cutting guide system of claim 10, wherein said spaced apart arches are spaced to provide the viewing windows for observing the disposition of the femoral head contained in said interior volume.

12. The bone cutting guide system of claim 1, further including a guidewire sized for passage through said center hole of said guidewire guide.

13. The bone cutting guide system of claim 12, further including a cannulated reamer having a generally planar top configured to rest atop said annular upper rim of said upwardly extending cylindrical portion, wherein said cylindrical portion provides a tool stop to prevent drilling into a femoral head too deeply.

14. The bone cutting guide system of claim 13, wherein said cannulated reamer includes a cannulated core sized to fit over said guidewire and has between two and ten blades sized to pass through said cylindrical passage of said upwardly extending cylindrical portion when rotating under power from a power drill.

* * * * *